US012346935B2

(12) United States Patent
Kobayashi et al.

(10) Patent No.: US 12,346,935 B2
(45) Date of Patent: *Jul. 1, 2025

(54) INFORMATION PROCESSING APPARATUS, INFORMATION PROCESSING METHOD, AND COMPUTER READABLE RECORDING MEDIUM FOR PROVIDING INFORMATION TO A PASSENGER

(71) Applicant: NEC Corporation, Tokyo (JP)

(72) Inventors: Masanori Kobayashi, Tokyo (JP); Akihiko Ichikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/386,414

(22) Filed: Nov. 2, 2023

(65) Prior Publication Data
US 2024/0062248 A1 Feb. 22, 2024

Related U.S. Application Data

(63) Continuation of application No. 17/633,709, filed as application No. PCT/JP2020/010952 on Mar. 12, 2020, now Pat. No. 11,853,925.

(51) Int. Cl.
G06Q 30/00 (2023.01)
G06Q 30/0251 (2023.01)
(Continued)

(52) U.S. Cl.
CPC ......... G06Q 30/0269 (2013.01); G06Q 50/14 (2013.01); G06V 40/172 (2022.01)

(58) Field of Classification Search
None
See application file for complete search history.

(56) References Cited

U.S. PATENT DOCUMENTS 9,965,819 B1  5/2018 DeVries ............... G06Q 50/265
2003/0229897 A1* 12/2003 Frisco ................ H04N 21/2187
                                                    348/E7.071
(Continued)

FOREIGN PATENT DOCUMENTS

AU  2013200450 A1 * 8/2013 ......... G06K 9/00255
JP  2000-163689 A  6/2000
(Continued)

OTHER PUBLICATIONS

Grant Wiley et al., "Make the customer experience soar with digital signage", Feb. 16, 2017, www.AviationPros.com (Year: 2017).*
(Continued)

Primary Examiner — Naresh Vig

(57) ABSTRACT

An information processing apparatus acquires face image data of a passenger 55 who has disembarked from an aircraft from an image capture device, and acquires identification information corresponding to the face image data acquired from the image capture device from the storage device. In the storage device, the identification information of the passenger, which includes flight information of the passenger, and the face image data of the passenger are stored in association with each other in advance. The information processing apparatus determines, based on the flight information included in the acquired identification information, whether the passenger is a passenger who is to re-board an aircraft after disembarking from the aircraft. If the passenger is a re-boarding passenger, a tour suitable for the passenger is determined based on the acquired identification information, and the information is displayed on the display devices.

12 Claims, 8 Drawing Sheets

(51) Int. Cl.
*G06Q 50/14* (2012.01)
*G06V 40/16* (2022.01)

(56) References Cited

U.S. PATENT DOCUMENTS

| | | | |
|---|---|---|---|
| 2011/0284627 A1 | 11/2011 | Stefani | G06Q 90/20 235/375 |
| 2013/0070974 A1 | 3/2013 | Stefani | |
| 2018/0210613 A1 | 7/2018 | Chen et al. | |
| 2020/0019691 A1 | 1/2020 | Milgram | G06F 21/32 |

FOREIGN PATENT DOCUMENTS

| | | |
|---|---|---|
| JP | 2006-099483 A | 4/2006 |
| JP | 2007-048132 A | 2/2007 |
| JP | 2007-079656 A | 3/2007 |
| JP | 2007-257219 A | 10/2007 |
| JP | 2009-205504 A | 9/2009 |
| JP | 2015-018545 A | 1/2015 |
| JP | 2015-103234 A | 6/2015 |
| JP | 2018-534662 A | 11/2018 |
| JP | 2019-082450 A | 5/2019 |
| WO | WO-2019006503 A1 * | 1/2019 ............... G06K 9/00 |

OTHER PUBLICATIONS

"How to score a free tour of Singapore while transiting through Changi Airport", Dec. 12, 2019, Changi Airport (Year: 2019).*
International Search Report for PCT Application No. PCT/JP2020/010952, mailed on Aug. 11, 2020.
English translation of Written opinion for PCT Application No. PCT/JP2020/010952, mailed on Aug. 11, 2020.
Extended European Search Report for EP Application No. 20924092.8, dated on Mar. 3, 2023.
JP Office Action for JP Application No. 2022-505672, mailed on Aug. 22, 2023 with English Translation.
Changi Airport published article "How to Score a Free tour of Singapore while transiting through Changi Airport", Dec. 12, 2019 , www.ChangiAirport.com (Year: 2019).

* cited by examiner

Fig.4

```
OPTIMAL TOURS FOR MR./MS. AAA

1. POPULAR FOR PEOPLE
       IN THEIR 20s (A)XXX TOUR
      _____
      _____

(B)YYY TOUR
      _____
      _____
```

INFORMATION PROCESSING APPARATUS, INFORMATION PROCESSING METHOD, AND COMPUTER READABLE RECORDING MEDIUM FOR PROVIDING INFORMATION TO A PASSENGER

CROSS REFERENCE TO RELATED APPLICATIONS

This application is a Continuation of U.S. application Ser. No. 17/633,709 filed on Feb. 8, 2022, which is a National Stage Entry of International Application No. PCT/JP2020/010952 filed on Mar. 12, 2020, the contents of all of which are incorporated herein by reference, in their entirety.

TECHNICAL FIELD

The present invention relates to an information processing apparatus, an information processing method, and a computer readable recording medium.

BACKGROUND ART

Many display devices that display various types of information are installed in airport facilities. These display devices display flight information of aircraft, information regarding airport facilities, information regarding a transportation system operating at the airport, and the like. For example, Patent Document 1 discloses an invention for displaying guidance information for a transportation system. In Patent Document 1, a database in which a face image and a destination are registered in association with each other is searched, a destination corresponding to a captured face image of a user is acquired, and guidance information to the destination is generated and displayed.

LIST OF RELATED ART DOCUMENTS

Patent Document

Patent Document 1: Japanese Patent Laid-Open Application No. 2009-205504

SUMMARY OF INVENTION

Problems to be Solved by the Invention

Incidentally, in the case of an airport, and in particular, a hub airport, passengers stay at the airport for a long time due to aircraft transfer or the like in some cases. In this case, some passengers participate in tours at the airport where they disembark for a transfer, or rest at a hotel. For this reason, it is desirable to display information to passengers who have time to spare and suggest an optimum service. In Patent Document 1, it is not possible to display information suitable for such a passenger, and it is not possible to suggest sufficient services to the passengers.

In view of this, an example of an object of the present invention is to provide an information processing apparatus, an information processing method, and a computer readable recording medium that display information to a passenger who has disembarked from an aircraft.

Means for Solving the Problems

In order to achieve the above-described object, an information processing apparatus according to an aspect of the present invention includes:

a biological information acquisition unit configured to acquire biological information of a passenger who has disembarked from an aircraft;

an identification information acquisition unit configured to acquire identification information corresponding to the acquired biological information from a storage device in which identification information of the passenger, which includes flight information of the passenger, and the biological information of the passenger are stored in association with each other in advance;

a passenger determination unit configured to determine, based on the flight information included in the acquired identification information, whether the passenger is a passenger who is to re-board an aircraft after disembarking from the aircraft;

a tour determination unit configured to determine a tour suitable for the passenger based on the acquired identification information if the passenger is a re-boarding passenger; and a display control unit configured to display information of the determined tour on a display device.

Also, in order to achieve the above-described object, an information processing method according to an aspect of the present invention includes:

a step of acquiring biological information of a passenger who has disembarked from an aircraft;

a step of acquiring identification information corresponding to the acquired biological information from a storage device in which identification information of the passenger, which includes flight information of the passenger, and the biological information of the passenger are stored in association with each other in advance;

a step of determining, based on the flight information included in the acquired identification information, whether the passenger is a passenger who is to re-board an aircraft after disembarking from the aircraft;

a step of determining a tour suitable for the passenger based on the acquired identification information if the passenger is a re-boarding passenger; and a step of displaying information of the determined tour on a display device.

Furthermore, in order to achieve the above-described object, a computer readable recording medium according to an aspect of the present invention includes a program recorded thereon, the program including instructions that cause a computer to carry out:

a step of acquiring biological information of a passenger who has disembarked from an aircraft;

a step of acquiring identification information corresponding to the acquired biological information from a storage device in which identification information of the passenger, which includes flight information of the passenger, and the biological information of the passenger are stored in association with each other in advance;

a step of determining, based on the flight information included in the acquired identification information, whether the passenger is a passenger who is to re-board an aircraft after disembarking from the aircraft; and a step of determining a tour suitable for the passenger based on the acquired identification information if the passenger is a re-boarding passenger.

Advantageous Effects of the Invention

According to the present invention, information can be displayed to a passenger who has disembarked from an aircraft.

BRIEF DESCRIPTION OF THE DRAWINGS

FIG. 4 is a diagram showing an example of a display screen displayed on a display device installed at an airport.

EXAMPLE EMBODIMENTS

Hereinafter, an information processing apparatus, an information processing method, and a program according to an example embodiment of the present invention will be described with reference to FIGS. 1 to 8.

[Apparatus Configuration]

Figure 1:
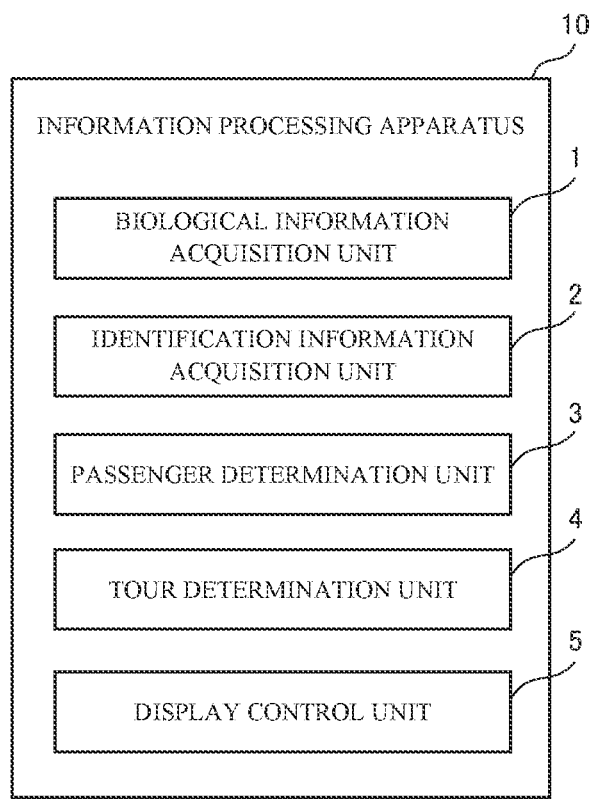
FIG. 1 is a block diagram showing a configuration of an information processing apparatus.

First, a configuration of the information processing apparatus according to the present example embodiment will be described with reference to FIG. 1. FIG. 1 is a block diagram showing a configuration of an information processing apparatus 10.

The information processing apparatus 10 is an apparatus that displays information to a passenger who is to stay at an airport for a long time for transit or transfer. The information processing apparatus 10 includes a biological information acquisition unit 1, an identification information acquisition unit 2, a passenger determination unit 3, a tour determination unit 4, and a display control unit 5.

The biological information acquisition unit 1 acquires biological information of a passenger who has disembarked from the aircraft. The biological information includes face image data, fingerprint data, vocal cord data, iris data, and the like.

The identification information acquisition unit 2 acquires the identification information corresponding to the biological information acquired by the biological information acquisition unit 1 from a storage device in which the identification information of the passenger, which includes the flight information of the passenger, and the biological information of the passenger are stored in association with each other in advance.

The passenger determination unit 3 determines whether the passenger is a passenger who is to re-board an aircraft after disembarking from an aircraft (hereinafter referred to as a transit passenger) based on the flight information included in the identification information acquired by the biological information acquisition unit 1.

If the passenger is a transit passenger, the tour determination unit 4 determines a tour suitable for the passenger based on the identification information acquired by the biological information acquisition unit 1.

The display control unit 5 displays information of the determined tour on the display device.

If the passenger who has disembarked from the aircraft is a transit passenger, the information processing apparatus 10 having this configuration can display information of a tour suitable for that passenger. For example, a transit passenger stays at the airport for a long time in some cases. For this reason, due to the information processing device 10 displaying the tour information, the transit passenger can effectively spend a layover at the airport.

Next, the configuration of the information processing apparatus 10 in the present example embodiment will be described more specifically.

Figure 2:
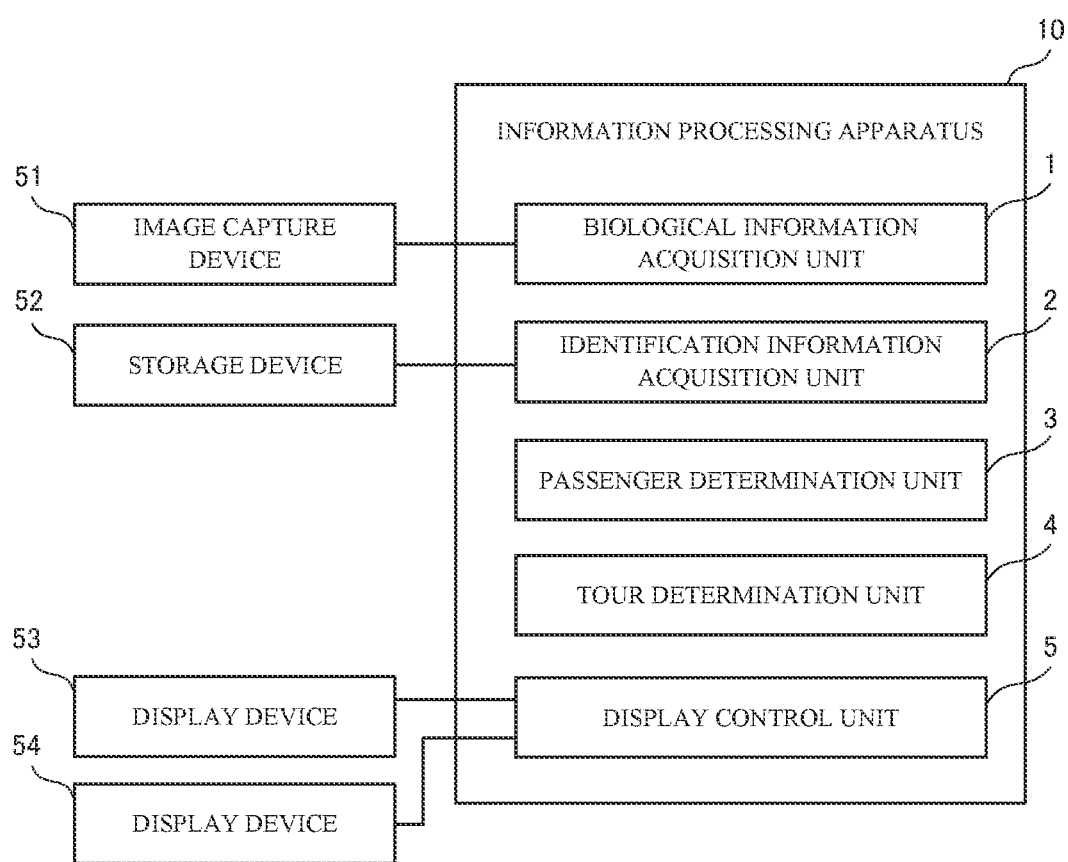
FIG. 2 is a block diagram for specifically illustrating the information processing apparatus.
Figure 3:
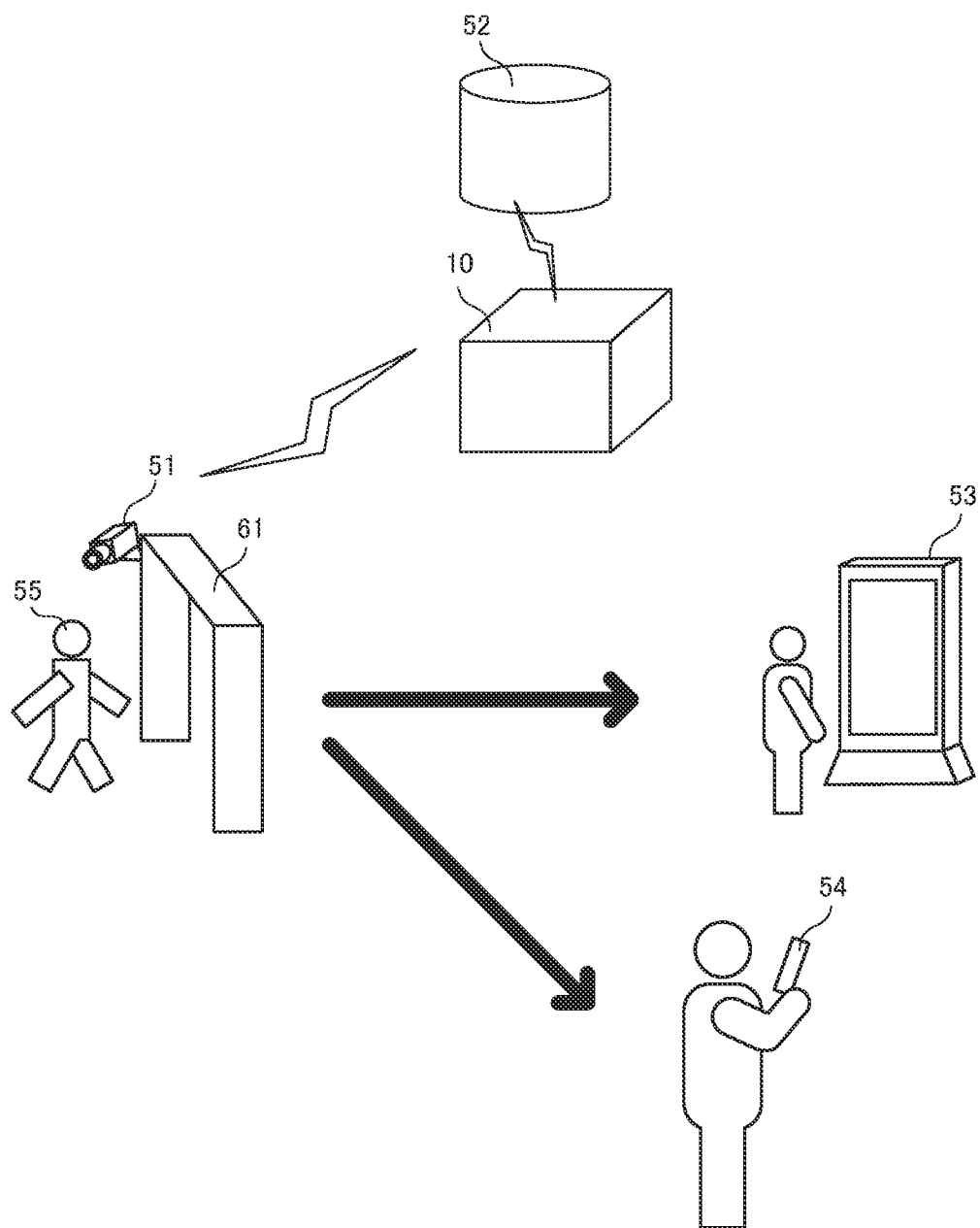
FIG. 3 is a diagram for illustrating information display performed by the information processing apparatus.

FIG. 2 is a block diagram for specifically describing the information processing apparatus 10. FIG. 3 is a diagram for describing information display performed by the information processing apparatus 10. Hereinafter, biological information will be described as face image data.

The information processing apparatus 10 is connected to an image capture device 51, a storage device 52, and a display device 53 so as to be capable of data communication therewith.

The image capture device 51 is a device that is installed in an airport facility and captures an image of the face of the passenger 55. The image capture device 51 is installed at a location where an image of the face of the passenger 55 who has disembarked from an aircraft can be captured, such as an arrival gate or a baggage claim area of the airport. FIG. 3 shows a state in which the image capture device 51 is provided at an arrival gate 61 and captures an image of the face of the passenger 55 passing through the arrival gate 61. Note that the image capture device is installed at not only the arrival gate 61, but at each touch point such as check-in, baggage deposit, identity confirmation before a security inspection, and departure inspection at the departure airport, and immigration inspection, customs procedures, and the arrival gate at the arrival airport. Then, an image of the face of the passenger 55 is captured at each touch point.

The storage device 52 stores identification information of the passenger 55 and face image data of the passenger 55 in association with each other. The identification information includes unique information and flight information. The unique information is passport information, an e-mail address, and the like of the passenger 55. The passport information includes a name, nationality, gender, passport number, and so on. The flight information is a destination, transit point, departure and arrival times of the aircraft, and the like of the passenger 55. The flight information need only include at least information according to which it is possible to determine that the passenger 55 is a transit passenger, for example, information on the destination of the passenger 55, information on the departure and arrival of the aircraft to be boarded, and the like, and the information included in the flight information is not limited to the above.

For example, during check-in at the departure airport, identity confirmation is performed by matching the passport of passenger 55 and the face image data, and then the face image data, flight information, and unique information are associated with each other and registered in the storage device 52. The passenger 55 is registered, for example, using a dedicated terminal installed at the airport. This makes it possible to confirm the identity by capturing an image of the face of the passenger 55 at each touch point after check-in. At each touch point, when an image of the face is captured, the face image data of the passenger 55 is selected from the storage device 52 through one-to-N matching using the captured face image data. By acquiring the unique information and flight information corresponding to the selected face image data, identity confirmation is performed at each touch point. Note that it is possible to manage the procedure status of passenger 55 due to being able to confirm the identity through face recognition at each touch point.

The information processing apparatus 10 or another apparatus may perform various procedures through face recognition and the processing for storage in the storage device. Also, in the above description, the face image data, the unique information, and the flight information (identification information) are registered in the storage device 52 during check-in, but the timing of registration in the storage device 52 is not limited to this. For example, the passenger 55 may store the unique information, the flight information (identification information), and the face image data in association with each other in advance using a dedicated application of a mobile terminal such as a smartphone, a dedicated website, or the like.

The display device 53 is installed in the airport, for example, near the arrival gate 61. The display device 53 is, for example, a liquid crystal display device, and displays various types of information. Note that the display device 53 may be provided in one piece with an image capture device, or may be provided with an image capture device separately from the display device 53 in cooperation with the display device 53 to capture the face of the passenger 55 looking at the display device 53.

The information processing apparatus 10 and the storage device 52 are connected to a network, and the installation location may be in the airport or in a facility other than the airport.

Also, the information processing apparatus 10 can transmit data to a display device 54. The display device 54 is, for example, a smartphone, a tablet terminal, a PC (personal computer), or the like owned by the passenger 55. The information processing apparatus 10 transmits an e-mail to the display device 54 based on the e-mail address included in the unique information obtained by capturing an image of the face of the passenger 55.

As described above, the information processing apparatus 10 includes the biological information acquisition unit 1, the identification information acquisition unit 2, the passenger determination unit 3, the tour determination unit 4, and the display control unit 5.

The biological information acquisition unit 1 acquires face image data of the passenger 55 from the image capture device 51. For example, as shown in FIG. 3, when the passenger 55 passes through the arrival gate 61, the image capture device 51 captures an image of the face of the passenger 55. The biological information acquisition unit 1 acquires face image data of the passenger 55 passing through the arrival gate 61. Note that if the display device 53 is provided with an image capture device, the biological information acquisition unit 1 may acquire face image data of the passenger 55 captured when the passenger 55 looks at the display device 53.

The identification information acquisition unit 2 acquires identification information corresponding to the face image data acquired by the biological information acquisition unit 1 from the storage device 52. When the biological information acquisition unit 1 acquires the face image data, the identification information acquisition unit 2 selects the face image data from the storage device 52 through one-to-N matching using the face image data. The identification information acquisition unit 2 acquires the identification information associated with the selected face image data from the storage device 52.

The passenger determination unit 3 determines, based on the flight information included in the identification information, whether the passenger 55 whose image was captured by the biological information acquisition unit 1 is a transit passenger. For example, the passenger determination unit 3 determines, based on the flight information included in the identification information, whether the airport in which the image of the passenger 55 was captured (the airport where the image capture device 51 is installed) is the destination of the passenger 55. If it is not the destination, the passenger determination unit 3 determines that the passenger 55 is a transit passenger.

Note that transit passengers include passengers who are to re-board an aircraft different from the one they disembarked from, and passengers who are to re-board the same aircraft as the one they disembarked from.

If the passenger 55 is a transit passenger, the tour determination unit 4 determines a suitable tour for the passenger 55. The tour determination unit 4 determines a suitable tour for the passenger 55 based on the identification information. The tour determination unit 4 first searches for a tour being held on the current day. The tour determination unit 4 may search for a tour by having a tour provider provide information, or the information may be stored in the storage device 52 and the tour determination unit 4 may search from the storage device 52.

The tour determination unit 4 selects a tour suitable for the passenger 55 from among the searched-for tours based on the unique information or the flight information included in the identification information acquired by the identification information acquisition unit 2. For example, the tour determination unit 4 selects a tour that is popular with people who have the same nationality as the passenger 55 or are close in age to the passenger 55, based on the nationality, age, and gender of the passenger 55. The nationality, age, and gender of the passenger 55 are acquired from the passport information included in the unique information. Alternatively, the tour determination unit 4 estimates the stay time of the passenger 55 at the airport from the flight information, and selects a tour that can be participated in within the stay time. The stay time is, for example, the time from the current time until the transfer flight to be re-boarded starts boarding. Alternatively, the tour determination unit 4 acquires the destination of the flight of the passenger 55 and selects a tour according to the travel preference of the passenger 55.

The tour determination unit 4 may acquire information on the destination of the tour (hereinafter referred to as a sightseeing area), and narrow down the tours from the selected tours by reflecting that information. Information about a sightseeing area is information such as the degree of congestion of the sightseeing area, the weather at the sightseeing area, an event being held at the sightseeing area, and traffic conditions around the sightseeing area. The degree of congestion of the sightseeing area is, for example, the degree of concentration of people, and can be calculated by acquiring an image from an image capture device installed at the sightseeing area and performing image recognition on people in the image. In this case, it is possible to suggest a tour in which real-time information is reflected.

When reflecting the degree of congestion, the tour determination unit 4 may not select a tour if the degree of congestion is a predetermined value or more, or may not select a tour if the degree of congestion is less than the predetermined value, because the sightseeing area is inactive.

Also, when reflecting the information of the event held in the tourist spot, the tour determination unit 4 may preferentially select a tour in which an event is being held in the sightseeing area of the tour.

When reflecting the traffic conditions, the tour determination unit 4 calculates the round-trip time between the airport and the sightseeing area. Then, the tour determination unit 4 may select a tour in which the time obtained by subtracting the round-trip time from the stay time of the passenger 55 at the airport is a predetermined value or more.

When reflecting the weather at the sightseeing area, the tour determination unit 4 may not select a tour because the sightseeing area cannot be enjoyed when it is raining (e.g., the scenery is bad).

Also, the tour determination unit 4 may include information of a companion such as a family member of the passenger 55 in the identification information and determine a tour suitable for the passenger 55 based on the information of the companion. For example, if the companion of the passenger 55 is a child, the tour determination unit 4 determines a tour suited to a child.

The display control unit 5 displays the information determined by the tour determination unit 4 on the display device 53, or transmits the information determined by the tour determination unit 4 to the display device 54 owned by the passenger 55 by e-mail.

FIG. 4 is a diagram showing an example of a display screen displayed on the display device 53 installed at the airport.

If the passenger 55 who has disembarked from the aircraft is a transit passenger, the display control unit 5 suggests the tour to the passenger 55 by displaying the information of the tour as shown in FIG. 4 on the display device 53. FIG. 4 is an example of a display screen including information on tours selected based on the age of passenger 55. Note that if the display device 53 is, for example, a touch panel type, more detailed information may be displayed when the displayed tour information is selected. Also, when the tour information is displayed, the passenger 55 may be able to input the number or age of his or her companion. In this case, the tour determination unit 4 re-determines the tour according to the input information, and the display control unit 5 displays the determined tour information.

Figure 5:
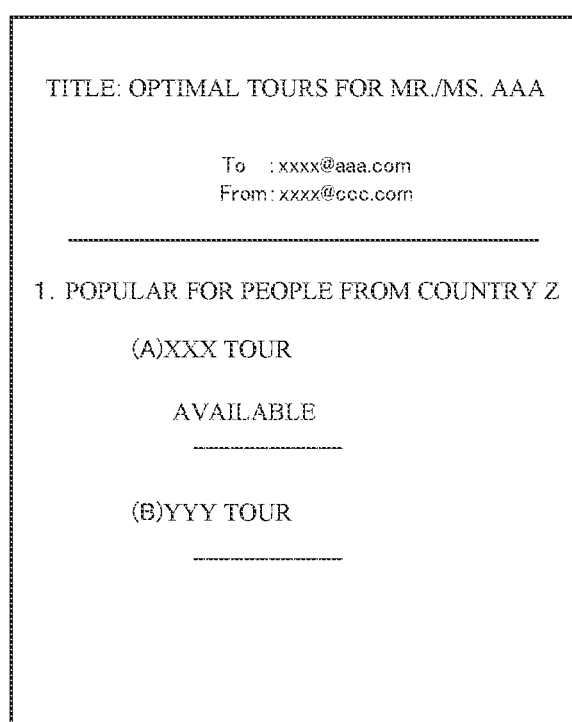
FIG. 5 is a diagram showing an example of a display screen displayed on a display device owned by a passenger.
Figure 6:
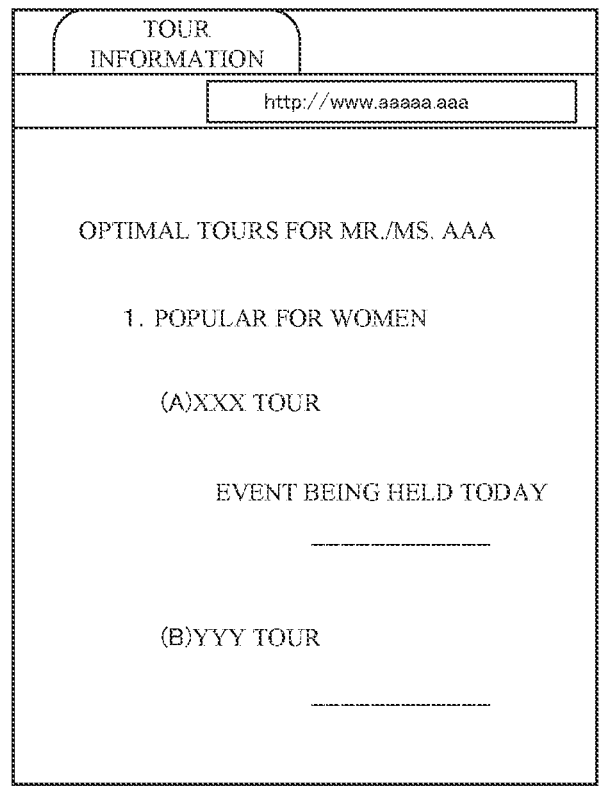
FIG. 6 is a diagram showing an example of a display screen displayed on the display device owned by the passenger.

FIGS. 5 and 6 are diagrams showing an example of a display screen displayed on the display device 54 owned by the passenger 55.

The display control unit 5 sends an e-mail including the information of the tour to the display device 54. As a result, a mail screen as shown in FIG. 5 is displayed on the display device 54. FIG. 5 is an example of a display screen including the information of a tour selected based on the nationality of passenger 55 and information of a tour selected reflecting the degree of congestion at the destination of the tour.

Alternatively, the display control unit 5 transmits an address of a website displaying the information of the tour to the display device 54 by e-mail. The owner (passenger 55) of the display device 54 taps (clicks on) the address included in the e-mail to display the website screen as shown in FIG. 6. FIG. 6 is an example of a display screen including information on a tour selected based on the gender of the passenger 55 and information on a tour selected by reflecting the event information of the destination of the tour. Note that when the information of the tour displayed on the display device 54 is selected, more detailed information may be displayed. Also, when the information of the tour is displayed, the passenger 55 may be able to input the number or age of his or her companion. In this case, the tour determination unit 4 re-determines the tour according to the input information, and the display control unit 5 displays the determined tour information. Also, since the passenger 55 whose face image was captured and his or her companion are linked with the same flight reservation number, even if the passenger 55 is not input, the tour determination unit 4 may specify the companion based on the reservation number included in the flight information and determine a tour corresponding to the unique information of the companion.

The passenger 55, who is a transit passenger, can acquire information on an effective way to spend time at the airport where the passenger 55 is to stay for a long time by checking the screens shown in FIGS. 4 to 6. Also, by displaying the information on the display device 54 owned by the passenger 55, it is possible to prevent personal information such as the name of the passenger 55 from being known by a third party.

[Apparatus Operation]

Figure 7:
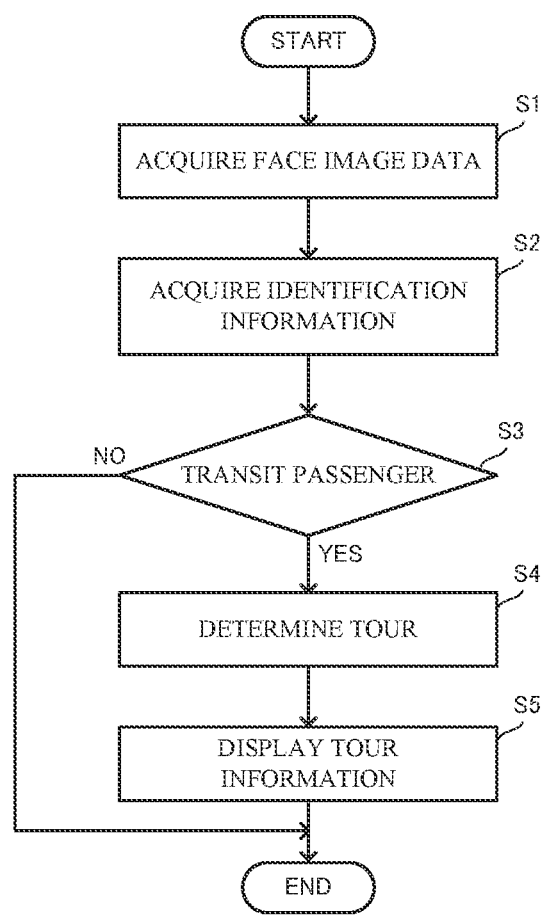
FIG. 7 is a flowchart showing the operation of the information processing apparatus.

Next, the operation of the information processing apparatus 10 in the present example embodiment will be described with reference to FIG. 7. FIG. 7 is a flow chart showing the operation of the information processing apparatus 10. In the following description, FIGS. 1 to 6 will be referred to as appropriate. Also, in the present example embodiment, the status notification method is implemented by operating the information processing apparatus 10. Accordingly, the description of the information processing method in this example embodiment is replaced with the following description of the operation of the information processing apparatus 10. Also, in the description of FIG. 7, the biological information is face image data.

The biological information acquisition unit 1 acquires face image data captured by the image capture device 51 (S1). The identification information acquisition unit 2 acquires the identification information corresponding to the face image data from the storage device 52 (S2). The passenger determination unit 3 determines whether the passenger 55 of the face image data is a transit passenger based on the flight information included in the identification information acquired in S2 (S3).

If the passenger is a transit passenger (S3: YES), the tour determination unit 4 determines a suitable tour for the passenger 55 based on the identification information (S4). As shown in FIGS. 4 to 6, the display control unit 5 displays the information of the determined tour on the display devices 53 and 54 (S5). When displaying on the display device 54, the display control unit 5 transmits an e-mail including the information to be displayed or an e-mail including the address of the website on which the information is displayed to the display device 54. At this time, the display control unit 5 acquires the e-mail address from the unique information included in the identification information acquired in S2, and transmits an e-mail based on the e-mail address.

If the passenger 55 is not a transit passenger (S3: NO), this flow ends without being displayed the tour information on the display devices 53 and 54 by the display control unit 5.

[Program]

The program according to this example embodiment may be any program that causes a computer to execute steps S1 to S5 shown in FIG. 7. By installing and executing this program on a computer, the information processing apparatus 10 and the information processing method according to the present example embodiment can be realized. In this case, the processor of the computer functions as the biological information acquisition unit 1, the identification information acquisition unit 2, the passenger determination unit 3, the tour determination unit 4, and the display control unit 5 and performs processing.

Note that if the computer on which the program of the present example embodiment is installed functions as the display control unit 5, the program of the present example embodiment may be any program that causes the computer to execute steps S1 to S4 shown in FIG. 7. That is, if the computer on which the program is installed has a function of displaying the generated information, the program of the present example embodiment generates tour information, and an existing display function need only be used for the screen display on the display devices 53 and 54.

Also, the program in the present example embodiment may be executed by a computer system constructed by a plurality of computers. In this case, for example, each computer may function as any one of the biological information acquisition unit 1, the identification information acquisition unit 2, the passenger determination unit 3, the tour determination unit 4, and the display control unit 5.

In addition to general-purpose PCs, examples of computers include smartphones and tablet terminal devices.

(Physical Configuration of the Apparatus)

Figure 8:
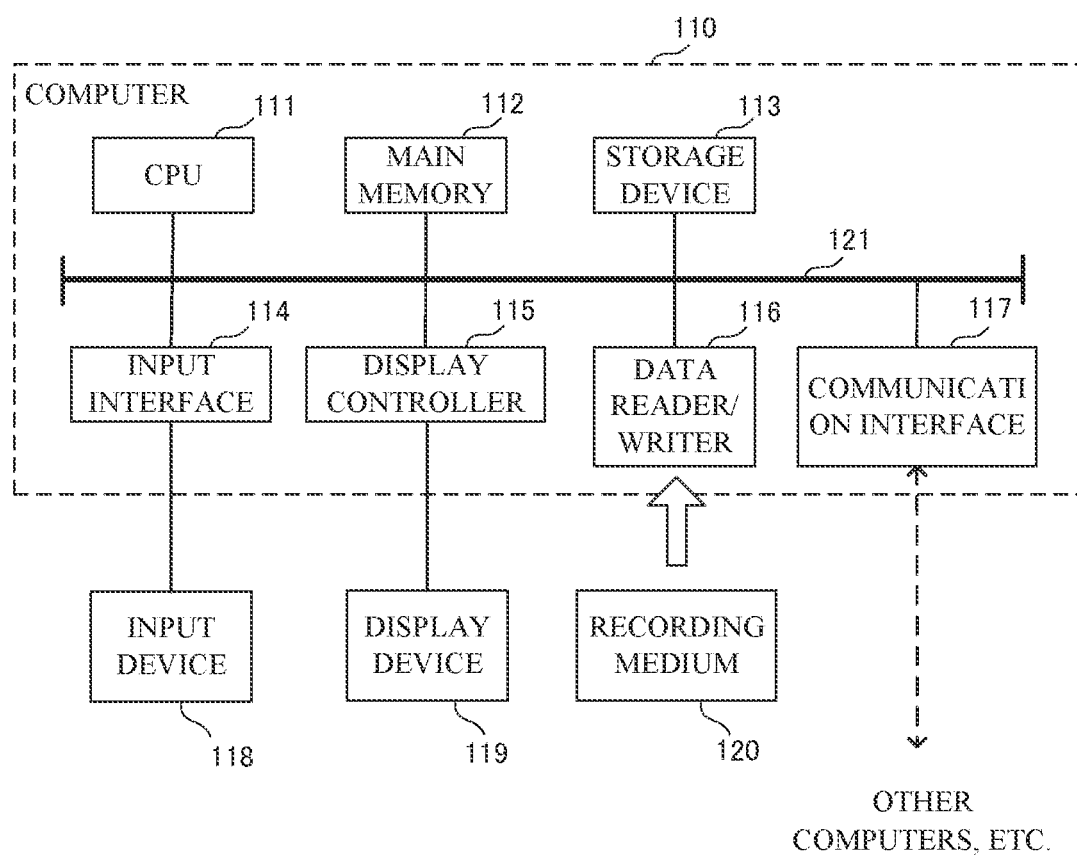
FIG. 8 is a block diagram showing an example of a computer that realizes an information processing apparatus.

Here, a computer that realizes the information processing apparatus 10 by executing the program in the example embodiment will be described with reference to FIG. 8. FIG. 8 is a block diagram showing an example of a computer that realizes the information processing apparatus 10.

As shown in FIG. 8, the computer 110 includes a CPU (Central Processing Unit) 111, a main memory 112, a storage device 113, an input interface 114, a display controller 115, a data reader/writer 116, and a communication interface 117. These units are connected to each other via a bus 121 so as to be capable of data communication. Note that the computer 110 may include a GPU (Graphics Processing Unit) or an FPGA (Field-Programmable Gate Array) in addition to the CPU 111 or in place of the CPU 111.

The CPU 111 loads the program (codes) of the present example embodiment stored in the storage device 113 into the main memory 112, and executes the program in a predetermined order to perform various computations. The main memory 112 is typically a volatile storage device such as a DRAM (Dynamic Random Access Memory). Also, the program according to the present example embodiment is provided in a state of being stored in a computer readable recording medium 120. Note that the program according to the present example embodiment may also be distributed on the Internet, which is connected to via the communication interface 117.

Also, specific examples of the storage device 113 may include a semiconductor storage device such as a flash memory in addition to a hard disk. The input interface 114 mediates data transmission between the CPU 111 and input devices 118 such as a keyboard and mouse. The display controller 115 is connected to a display device 119 and controls the display on the display device 119. The data reader/writer 116 mediates data transmission between the CPU 111 and the recording medium 120, reads out the program from the recording medium 120, and writes the result of processing performed by the computer 110 in the recording medium 120. The communication interface 117 mediates data transmission between the CPU 111 and other computers.

Specific examples of the recording medium 120 include a general-purpose semiconductor storage device such as a CF (Compact Flash (registered trademark)) or an SD (Secure Digital), a magnetic storage medium such as a Flexible Disk, and an optical storage medium such as a CD-ROM (Compact Disk Read Only Memory).

A portion or all of the above-described example embodiment can be expressed by (Supplementary note 1) to (Supplementary note 27) described below, but is not limited thereto.

(Supplementary Note 1)

An information processing apparatus including:
a biological information acquisition unit configured to acquire biological information of a passenger who has disembarked from an aircraft;
an identification information acquisition unit configured to acquire identification information corresponding to the acquired biological information from a storage device in which identification information of the passenger, which includes flight information of the passenger, and the biological information of the passenger are stored in association with each other in advance;
a passenger determination unit configured to determine, based on the flight information included in the acquired identification information, whether the passenger is a passenger who is to re-board an aircraft after disembarking from the aircraft;
a tour determination unit configured to determine a tour suitable for the passenger based on the acquired identification information if the passenger is a re-boarding passenger; and
a display control unit configured to display information of the determined tour on a display device.

(Supplementary Note 2)

The information processing apparatus according to supplementary note 1,
in which the identification information includes unique information of the passenger, and
the tour determination unit determines a tour suitable for the passenger based on the unique information.

(Supplementary Note 3)

The information processing apparatus according to supplementary note 2,
in which the unique information includes an age, nationality, or gender of the passenger, and
the tour determination unit determines a tour suitable for the passenger based on the age, nationality, or gender of the passenger.

(Supplementary Note 4)

The information processing apparatus according to supplementary note 3,
in which the unique information includes passport information of the passenger, and
the age, nationality, or gender of the passenger is information included in the passport information.

(Supplementary Note 5)

The information processing apparatus according to any one of supplementary notes 1 to 4,
in which the tour determination unit determines a tour suitable for the passenger based on the flight information.

(Supplementary Note 6)

The information processing apparatus according to supplementary note 5,
in which the tour determination unit acquires a stay time of the passenger at an airport from the flight information, and determines a tour suitable for the passenger based on the stay time.

(Supplementary Note 7)

The information processing apparatus according to supplementary note 6,
 in which the tour determination unit acquires a round-trip time between the airport and a tour destination, and determines a tour for which a time obtained by subtracting the round-trip time from the stay time is a predetermined value or more.

(Supplementary Note 8)

The information processing apparatus according to supplementary note 5,
 in which the tour determination unit specifies a companion of the passenger from the flight information, and determines a tour suitable for the passenger based on unique information of the companion.

(Supplementary Note 9)

The information processing apparatus according to any one of supplementary notes 1 to 8,
 in which the biological information is face image data.

(Supplementary Note 10)

An information processing method including:
 a step of acquiring biological information of a passenger who has disembarked from an aircraft;
 a step of acquiring identification information corresponding to the acquired biological information from a storage device in which identification information of the passenger, which includes flight information of the passenger, and the biological information of the passenger are stored in association with each other in advance;
 a step of determining, based on the flight information included in the acquired identification information, whether the passenger is a passenger who is to re-board an aircraft after disembarking from the aircraft;
 a step of determining a tour suitable for the passenger based on the acquired identification information if the passenger is a re-boarding passenger; and
 a step of displaying information of the determined tour on a display device.

(Supplementary Note 11)

The information processing method according to supplementary note 10,
 in which the identification information includes unique information of the passenger, and
 when determining the tour, a tour suitable for the passenger is determined based on the unique information.

(Supplementary Note 12)

The information processing method according to supplementary note 11,
 in which the unique information includes an age, nationality, or gender of the passenger, and
 in the step of determining the tour, a tour suitable for the passenger is determined based on the age, nationality, or gender of the passenger.

(Supplementary Note 13)

The information processing method according to supplementary note 12,
 in which the unique information includes passport information of the passenger, and
 the age, nationality, or gender of the passenger is information included in the passport information.

(Supplementary Note 14)

The information processing method according to any one of claims 10 to 13,
 in which, in the step of determining the tour, a tour suitable for the passenger is determined based on the flight information.

(Supplementary Note 15)

The information processing method according to supplementary note 14,
 in which, in the step of determining the tour, a stay time of the passenger at an airport is acquired from the flight information, and a tour suitable for the passenger is determined based on the flight information.

(Supplementary Note 16)

The information processing method according to supplementary note 15,
 in which, in the step of determining the tour, a round-trip time between the airport and a tour destination is acquired, and a tour for which a time obtained by subtracting the round-trip time from the stay time is a predetermined value or more is determined.

(Supplementary Note 17)

The information processing method according to supplementary note 14,
 in which, in the step of determining the tour, a companion of the passenger is specified based on the flight information and a tour suitable for the passenger is determined based on unique information of the companion.

(Supplementary Note 18)

The information processing method according to any one of supplementary notes 10 to 17,
 in which the biological information is face image data.

(Supplementary Note 19)

A computer readable recording medium including a program recorded thereon, the program including instructions that cause a computer to carry out:
 a step of acquiring biological information of a passenger who has disembarked from an aircraft;
 a step of acquiring identification information corresponding to the acquired biological information from a storage device in which identification information of the passenger, which includes flight information of the passenger, and the biological information of the passenger are stored in association with each other in advance;
 a step of determining, based on the flight information included in the acquired identification information, whether the passenger is a passenger who is to re-board an aircraft after disembarking from the aircraft; and
 a step of determining a tour suitable for the passenger based on the acquired identification information if the passenger is a re-boarding passenger.

(Supplementary Note 20)

The computer readable recording medium according to supplementary note 19,
 in which the identification information includes unique information of the passenger, and
 in the step of determining the tour, a tour suitable for the passenger is determined based on the unique information.

(Supplementary Note 21)

The computer readable recording medium according to supplementary note 20,
 in which the unique information includes an age, nationality, or gender of the passenger, and
 in the step of determining the tour, a tour suitable for the passenger is determined based on the age, nationality, or gender of the passenger.

(Supplementary Note 22)

The computer readable recording medium according to supplementary note 21,
 in which the unique information includes passport information of the passenger, and the age, nationality, or gender of the passenger is information included in the passport information.
(Supplementary Note 23) The computer readable recording medium according to any one of supplementary notes 19 to 22,
  in which, in the step of determining the tour, a tour suitable for the passenger is determined based on the flight information.
(Supplementary Note 24)
The computer readable recording medium according to supplementary note 23,
  in which, in the step of determining the tour, a stay time of the passenger at an airport is acquired from the flight information, and a tour suitable for the passenger is determined based on the flight information.
(Supplementary Note 25)
The computer readable recording medium according to supplementary note 24,
  in which, in the step of determining the tour, a round-trip time between the airport and a tour destination is acquired, and a tour for which a time obtained by subtracting the round-trip time from the stay time is a predetermined value or more is determined.
(Supplementary Note 26)
The computer readable recording medium according to supplementary note 23,
  in which, in the step of determining the tour, a companion of the passenger is specified based on the flight information, and a tour suitable for the passenger is determined based on unique information of the companion.
(Supplementary Note 27)
The computer readable recording medium according to any one of supplementary notes 19 to 26,
  in which the biological information is face image data.

LIST OF REFERENCE SIGNS

1 Biological information acquisition unit
2 Identification information acquisition unit
3 Passenger determination unit
4 Tour determination unit
5 Display control unit
10 Information processing apparatus
51 Image capture device
52 Storage device
53 Display device
54 Display device
55 Passenger
61 Arrival gate
110 Computer
111 CPU
112 Main memory
113 Storage device
114 Input interface
115 Display controller
116 Data reader/writer
117 Communication interface
118 Input device
119 Display device
120 Recording medium
121 Bus

The invention claimed is:
1. An information processing apparatus comprising:
  at least one memory storing instructions; and
  at least one processor configured to execute the instructions to:
    acquire biological information of a passenger who has disembarked from an aircraft;
    acquire identification information corresponding to the acquired biological information from a storage device in which identification information of the passenger, which includes flight information of the passenger, and the biological information of the passenger are stored in association with each other in advance;
    determine, based on the flight information included in the acquired identification information, whether the passenger is a passenger who is to re-board an aircraft after disembarking from the aircraft;
    determine a tour suitable for the passenger based on the acquired identification information if the passenger is a re-boarding passenger;
    display information of the determined tour on a display device; and
    based on additional information input by the passenger after the display of the information of the determined tour, re-determine the tour according to the input additional information, and display the re-determined tour information,
  wherein the biological information includes a face image data of the passenger captured when the passenger looks at the display device.
2. The information processing apparatus according to claim 1,
  wherein the at least one processor is configured to execute the instructions to:
    determine a tour suitable for the passenger further based on whether the tour is popular with people who have the same nationality as the passenger or are close in age to the passenger.
3. The information processing apparatus according to claim 1,
  wherein the at least one processor is configured to execute the instructions to:
    determine a tour suitable for the passenger further based on a degree of congestion of a sightseeing area, a weather at the sightseeing area, an event being held at the sightseeing area, and traffic conditions around the sightseeing area.
4. The information processing apparatus according to claim 1,
  wherein the at least one processor is configured to execute the instructions to:
    determine a tour suitable for the passenger further based on a unique information of a companion of the passenger specified by the flight information.
5. An information processing method performed by a computer and comprising:
  acquiring biological information of a passenger who has disembarked from an aircraft;
  acquiring identification information corresponding to the acquired biological information from a storage device in which identification information of the passenger, which includes flight information of the passenger, and the biological information of the passenger are stored in association with each other in advance;
  determining, based on the flight information included in the acquired identification information, whether the passenger is a passenger who is to re-board an aircraft after disembarking from the aircraft;
  determining a tour suitable for the passenger based on the acquired identification information if the passenger is a re-boarding passenger;

displaying information of the determined tour on a display device; and based on additional information input by the passenger after the display of the information of the determined tour, re-determining the tour according to the input additional information, and displaying the re-determined tour information, wherein the biological information includes a face image data of the passenger captured when the passenger looks at the display device.

6. The information processing method according to claim 5, comprising:

determining the tour suitable for the passenger further based on whether the tour is popular with people who have the same nationality as the passenger or are close in age to the passenger.

7. The information processing method according to claim 5, comprising:

determining the tour suitable for the passenger further based on a degree of congestion of a sightseeing area, a weather at the sightseeing area, an event being held at the sightseeing area, and traffic conditions around the sightseeing area.

8. The information processing method according to claim 5, comprising:

determining the tour suitable for the passenger further based on a unique information of a companion of the passenger specified by the flight information.

9. A non-transitory computer readable recording medium storing a program executable by a computer to perform processing comprising:

acquiring biological information of a passenger who has disembarked from an aircraft;

acquiring identification information corresponding to the acquired biological information from a storage device in which identification information of the passenger, which includes flight information of the passenger, and the biological information of the passenger are stored in association with each other in advance;

determining, based on the flight information included in the acquired identification information, whether the passenger is a passenger who is to re-board an aircraft after disembarking from the aircraft;

determining a tour suitable for the passenger based on the acquired identification information if the passenger is a re-boarding passenger;

displaying information of the determined tour on a display device; and based on additional information input by the passenger after the display of the information of the determined tour, re-determining the tour according to the input additional information, and displaying the re-determined tour information, wherein the biological information includes a face image data of the passenger captured when the passenger looks at the display device.

10. The non-transitory computer readable recording medium according to claim 9, wherein the processing comprises:

determining the tour suitable for the passenger further based on whether the tour is popular with people who have the same nationality as the passenger or are close in age to the passenger.

11. The non-transitory computer readable recording medium according to claim 9, further wherein the processing comprises:

determining the tour suitable for the passenger further based on a degree of congestion of a sightseeing area, a weather at the sightseeing area, an event being held at the sightseeing area, and traffic conditions around the sightseeing area.

12. The non-transitory computer readable recording medium according to claim 9, wherein the processing comprises:

determining the tour suitable for the passenger further based on a unique information of a companion of the passenger specified by the flight information.

* * * * *